United States Patent
Heunermund

[11] Patent Number: 5,316,569
[45] Date of Patent: May 31, 1994

[54] DEVICE FOR FILTERING SEWER GASES

[76] Inventor: Frederick W. Heunermund, 1390 S. Hulgan Cir., DeSoto, Tex. 75115

[21] Appl. No.: 98,118

[22] Filed: Jul. 27, 1993

[51] Int. Cl.$^5$ .............................. B01D 53/04
[52] U.S. Cl. ............................ 96/134; 55/279; 96/136; 96/138
[58] Field of Search ............ 55/279, DIG. 17; 96/132, 134, 136, 137, 138

[56] References Cited

U.S. PATENT DOCUMENTS

| | | | |
|---|---|---|---|
| 4,411,675 | 10/1983 | de Castella | 55/279 X |
| 4,478,619 | 10/1984 | Arends et al. | 96/137 X |
| 4,612,026 | 9/1986 | Pollara et al. | 55/279 X |
| 4,848,989 | 7/1989 | Maeda | 55/DIG. 17 X |
| 4,900,341 | 2/1990 | Csabai | 96/136 |
| 5,174,798 | 12/1992 | Luby | 55/DIG. 17 X |

Primary Examiner—Charles Hart
Attorney, Agent, or Firm—Daniel V. Thompson

[57] ABSTRACT

A device for filtering sewer gases includes a main body member and lower and upper filter medium chambers. The lower chamber contain carbon as the filter medium and the upper chamber contains copper steel wool and a silver coil as a filter medium. An adapter member is fixed to the main body member for connection to a house sewer vent.

2 Claims, 1 Drawing Sheet

DEVICE FOR FILTERING SEWER GASES

FIELD OF INVENTION

This invention relates to plumbing devices, more particularly to a filter adapted for removing objectionable gases from household sewer vents.

BACKGROUND OF THE INVENTION

Typically residences are provided with tubular vent pipes that extend vertically through the roof to an outlet on their upper end. Methane and other objectionable gases escape from the upper open sewer vents into the atmosphere, where they cause environmental problems.

While a number of filtering devices have been proposed, none has satisfactorily addressed the problem of removing methane and other obnoxious gases from the outlet of household sewer vents. For example, U.S. Pat. Nos. 3,192,539 and 3,938,201 disclose ventilation systems for removing foul air and objectionable odors from a toilet through a roof top vent. U.S. Pat. Nos. 4,025,325 and 4,165,544 also disclose ventilation devices for ventilating odorous air from a bathroom. The ventilation device of U.S. Pat. No. 4,025,325 also includes an air filter. U.S. Pat. No. 4,342,258 discloses a ventilator which is mountable at the top of a conduit, such as a conduit for exhausting combustion gases. U.S. Pat. No. 2,784,801 teaches a combined air cleaner and vent mountable on the roof of a truck for preventing dust and bacteria from gaining entrance into the interior of the truck. U.S. Pat. No. 2,545,755 discloses apparatus for deodorizing the atmosphere, which is used in conjunction with a flush pipe, whereby the surrounding atmosphere is deodorized in response to the flushing action of water within the pipe.

U.S. Pat. No. 3,475,885 teaches a retainer adapted to fit over a sewer line vent. Air purifying medium is located in an annular space around the vent pipe such that the escaping gases must travel initially downward alongside the pipe into the purifying medium and then upwardly through the purifying medium and finally through outlet openings in the retainer to the atmosphere.

SUMMARY OF THE INVENTION

The aforementioned problem is solved by my invention, which includes a device for filtering sewer gases adapted to be fixed to the open upper end of a house sewer vent. A main body member contains lower and upper filter medium chambers. The lower chamber contains carbon as a filter medium, and the upper chamber contains copper steel wool as a filter medium.

BRIEF DESCRIPTION OF THE DRAWINGS

More complete understanding of the invention and its advantages will be gained from a review of the detailed description, in connection with the following drawings, in which.

DETAILED DESCRIPTION

Figure 1:
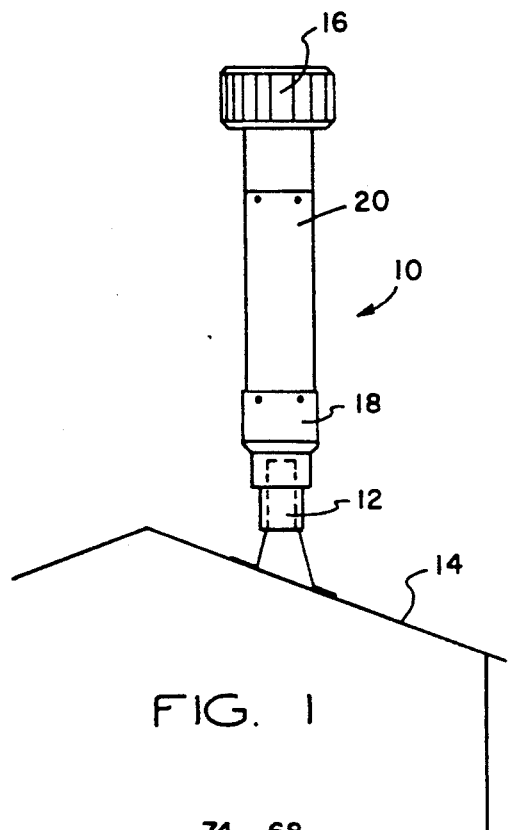
FIG. 1 is an overall side view of the device of the present invention.

Referring now to FIG. 1, device 10 is mounted to a house sewer vent 12 extending vertically through roof 14 of a residence. A conventional turbine or non-turbine vent 16 extends from the top of device 10. An adapter member 18 forms the lower portion of device 10, and a tubular main body member 20 extends upwardly from adapter member 18.

Referring now to FIGS. 2-6, tubular main body member 20 has a cylindrical inner wall 50 spanning between an open top 52 adapted for connection to vent 16 and an open bottom 54. In the preferred embodiment, main body member 20 is formed of PVC pipe. Lower and upper filter medium chambers 56 and 58, respectively, are disposed within the inner wall 50 of the main body member 20. Lower chamber 56 contains carbon 60 as a filter medium. The upper chamber 58 contains copper steel wool 62 and a silver coil 64 as filter media.

Figure 2:
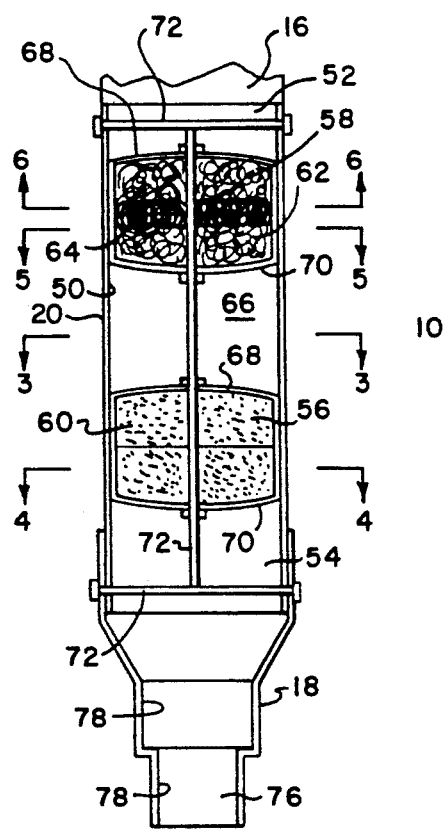
FIG. 2 is a partially broken away side view of the device of FIG. 1.
Figure 3:
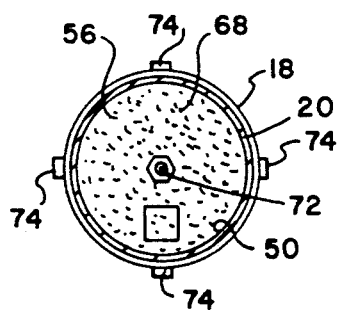
FIG. 3 is a section view taken along lines 3—3 of FIG. 2.
Figure 4:
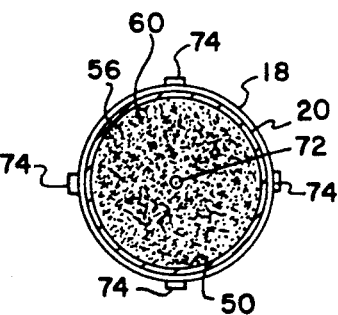
FIG. 4 is a section view taken along lines 4—4 of FIG. 2.
Figure 5:
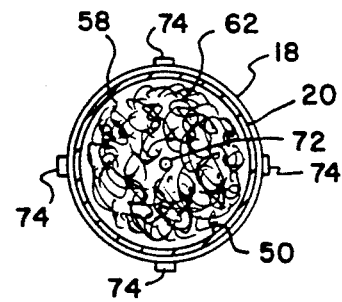
FIG. 5 is a section view taken along lines 5—5 of FIG. 2.
Figure 6:
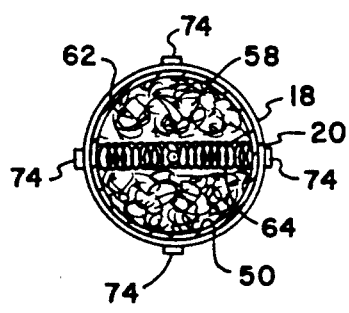
FIG. 6 is a section view taken along lines 6—6 of FIG. 2.

As best shown in FIG. 2, the lower and upper filter medium chambers 56, 58 are vertically spaced within the main body member 20 and separated by an air gap 66. Preferably, each chamber 56, 58 is formed by upper and lower, stainless steel, perforated bowls 68 and 70, respectively. Bowls 68, 70 locate the filter media within the main body member 20. Preferably, bowls 68, 70 are fixed within the main body member 20 by copper support rods 72 and copper nuts 74.

Adapter member 18 has an open bottom 76 having stepped cylindrical walls 78 adapted for connection to a house through a vent. Walls 78 are stepped in order to provide ready adaptation of the device to various sewer pipe sizes.

While the specific embodiment has been shown and described herein, it will be apparent to those skilled in the art that various changes and adaptations are possible within the scope of the appended claims.

I claim:

1. A device for filtering sewer gases, comprising:
   a main body member having an inner wall spanning between an open top adapted for connection to a vent top and an open bottom;
   lower and upper filter medium chambers disposed within the inner wall of the main body member, the lower chamber containing carbon as a filter medium and the upper chamber containing copper steel wool as a filter medium;
   an adapter member fixed to the main body member open bottom and having walls adapted for connection to a house sewer vent;
   with the lower and upper filter medium chambers being vertically spaced within the main body member and separated by an air gap;
   with each said chamber formed by upper and lower, stainless steel, perforated bowls locating the filter media within the main body member; and
   with the bowls being fixed within the main body member by copper support rods.

2. A device for filtering sewer gases, comprising:
   a tubular main body member having an cylindrical inner wall spanning between an open top adapted for connection to a vent top and an open bottom, the main body member formed of PVC pipe;

lower and upper filter medium chambers disposed within the inner wall of the main body member, the lower chamber containing carbon as a filter medium and the upper chamber containing copper steel wool and a silver coil as filter media;

the lower and upper filter medium chambers being vertically spaced within the main body member and separated by an air gap, with each said chamber formed by upper and lower, stainless steel, perforated bowls locating the filter media within the main body member;

the bowls being fixed within the main body member by copper support rods; and an adapter member fixed to the main body member open bottom and having stepped cylindrical walls adapted for connection to a house sewer vent.

* * * * *